US012251927B2

(12) United States Patent
Lin et al.

(10) Patent No.: US 12,251,927 B2
(45) Date of Patent: Mar. 18, 2025

(54) HEAT PRESS DEVICES

(71) Applicant: Enetshops, LLC, Fullerton, CA (US)

(72) Inventors: Jimmy Lin, Brea, CA (US); Dawei Cao, Dongguan (CN)

(73) Assignee: Enetshops, LLC, Fullerton, CA (US)

(*) Notice: Subject to any disclaimer, the term of this patent is extended or adjusted under 35 U.S.C. 154(b) by 0 days.

(21) Appl. No.: 18/519,451

(22) Filed: Nov. 27, 2023

(65) Prior Publication Data

US 2024/0083160 A1 Mar. 14, 2024

Related U.S. Application Data

(63) Continuation of application No. 17/813,207, filed on Jul. 18, 2022, now Pat. No. 11,878,506, which is a continuation of application No. 16/846,879, filed on Apr. 13, 2020, now Pat. No. 11,390,065.

(60) Provisional application No. 62/834,190, filed on Apr. 15, 2019.

(51) Int. Cl.

| | |
|---|---|
| ***B41F 16/02*** | (2006.01) |
| ***B30B 1/04*** | (2006.01) |
| ***B30B 15/04*** | (2006.01) |
| *B30B 15/34* | (2006.01) |
| *D06F 71/36* | (2006.01) |

(52) U.S. Cl.

CPC ................ *B41F 16/02* (2013.01); *B30B 1/04* (2013.01); *B30B 15/04* (2013.01); *B30B 15/34* (2013.01)

(58) Field of Classification Search

CPC . B41F 16/02; B30B 1/04; B30B 15/04; B30B 15/34; D06F 71/08; D06F 71/36

See application file for complete search history.

(56) References Cited

U.S. PATENT DOCUMENTS

| | | | |
|---|---|---|---|
| 1,344,214 | A | 6/1920 | Smith |
| 2,103,141 | A | 12/1937 | Bowen |
| 2,171,102 | A | 8/1939 | Oscar |
| 2,298,861 | A | 10/1942 | Stephen |
| 3,029,178 | A | 4/1962 | Carver |
| 3,406,472 | A | 10/1968 | Solomon |

(Continued)

FOREIGN PATENT DOCUMENTS

| | | | |
|---|---|---|---|
| CH | 595501 | | 2/1978 |
| CN | 203739398 U | * | 7/2014 |
| CN | 207579320 | | 7/2018 |

OTHER PUBLICATIONS

LC-60E Semi-Automatic Edge Banding Machine, Shandong Zihao Mechanics Machinery Co., Ltd product webpage, dated 2018, http://en.fengbianji.cc/product/10.html, in 4 pages.

(Continued)

*Primary Examiner* — Ismael Izaguirre

(74) *Attorney, Agent, or Firm* — DANE IP Law PC

(57) ABSTRACT

A heat press device is provided that includes a support structure, a first platen and a heating element assembly that includes a heating element and a second platen. The heat press device further includes a movement assembly configured to change a pressure state between the first platen and the second platen when the heat press device is in a closed configuration. The heat press device can also include an indicator that is configured to convey the pressure state between the first platen and the second platen when the heat press device is in the closed configuration.

18 Claims, 14 Drawing Sheets

(56) References Cited

U.S. PATENT DOCUMENTS

| | | | | |
|---|---|---|---|---|
| 3,454,741 | A | 7/1969 | Stewart | |
| 3,583,610 | A | 6/1971 | Forse | |
| 3,700,371 | A | 10/1972 | Edwards | |
| 5,167,750 | A | 12/1992 | Myers | |
| 5,252,171 | A | 10/1993 | Anderson | |
| 5,474,633 | A | 12/1995 | Myers | |
| 5,528,918 | A * | 6/1996 | Kirii | B21D 24/14 72/15.1 |
| 5,551,218 | A | 9/1996 | Henderson | |
| 5,832,817 | A | 11/1998 | Bignell | |
| 5,866,248 | A | 2/1999 | Dressler | |
| 6,058,834 | A | 5/2000 | Beckwith | |
| 6,151,814 | A | 11/2000 | Raio | |
| 6,391,133 | B1 * | 5/2002 | Dul | B29C 65/18 156/359 |
| 7,196,290 | B2 * | 3/2007 | Oliver | B29C 66/961 53/370.7 |
| 7,225,530 | B2 | 6/2007 | Ravert, Jr. | |
| 7,963,219 | B2 | 6/2011 | Robinson | |
| 8,042,588 | B2 | 10/2011 | Robinson | |
| 8,418,739 | B2 | 4/2013 | Robinson | |
| 9,121,120 | B2 | 9/2015 | Ciaramitaro | |
| 9,289,960 | B2 | 3/2016 | Robinson | |
| 9,596,899 | B2 | 3/2017 | Stahl | |
| 10,065,409 | B2 | 9/2018 | Robinson | |
| 10,493,713 | B2 | 12/2019 | Robinson | |
| D873,313 | S | 1/2020 | Galkin | |
| 10,569,530 | B2 | 2/2020 | Robinson | |
| 10,751,964 | B2 | 8/2020 | Galkin | |
| D926,850 | S | 8/2021 | Galkin | |
| D927,577 | S | 8/2021 | Galkin | |
| 11,390,065 | B2 * | 7/2022 | Lin | B41F 16/0046 |
| 11,878,506 | B2 * | 1/2024 | Lin | B41F 16/02 |
| 2009/0242096 | A1 | 10/2009 | Robinson | |
| 2011/0076079 | A1 * | 3/2011 | Robinson | B41F 17/003 100/295 |
| 2016/0250816 | A1 | 9/2016 | Robinson | |
| 2019/0184667 | A1 | 6/2019 | Cao | |
| 2020/0130405 | A1 | 4/2020 | Robinson | |
| 2020/0324542 | A1 | 10/2020 | Lin | |
| 2021/0252797 | A1 | 8/2021 | Anton | |

OTHER PUBLICATIONS

Hotronix Cap Press Operator's Manual, dated 2018, in 12 pages.

Hotronix Clam/Hover Press Operator's Manual, dated 2018, in 12 pages.

WF-60E Semi Auto Edge Banding Machine, Shandong Zihao Mechanics Machinery Co., Ltd product webpage, dated 2018, http://www.fengbianji.cc/product/13.html, in 7 pages.

* cited by examiner

HEAT PRESS DEVICES

INCORPORATION BY REFERENCE TO ANY PRIORITY APPLICATIONS

This application is a continuation application of Ser. No. 17/813,207, filed 2022 Jul. 18, which is a continuation application of Ser. No. 16/846,879, filed on 2020 Apr. 13, now U.S. Pat. No. 11,390,065, which claims the benefits of Prov. Pat. App. Ser. No. 62/834,190, filed on 2019 Apr. 15, the entire content of all of which are expressly incorporated herein by reference.

BACKGROUND OF THE INVENTION

Field of the Invention

This application relates to heat press devices, which can be used to impart a graphical work or other transfer material onto a T-shirt or other workpiece.

Description of the Related Art

Heat press devices, sometimes referred to herein as heat presses, are used in commercial settings to provide high volume through-put specific articles to be decorated. A heat press can be used to decorate a T-shirt by applying pressure and heat for a set period of time to a transfer material containing the decoration after the transfer material has been placed in contact with the T-shirt. Heat and pressure are generated by two platens, which are rigid and, in some cases, heavy plates that can be separated to provide access to the transfer material and T-shirt and then brought together to apply pressure thereto. One of the plates is also heated so that the combination of heat and pressure is provided.

The quality of the end product is affected by the heat and pressure conditions provided by the heat press. For example, although decorating clothing is a core application for heat presses other workpieces with different structures can be decorated in a heat press. For example, rigid materials such as metals, wood, and ceramics are sometimes decorated in a heat press. Even types of fabrics can vary significantly in their structure, for example from silk to leather. Also, the decorative pattern can be carried on a vast array transfer types. All these variations create challenges in heat press design and operation. A heat press could work very well if made for just one type of article and just one type of transfer material. However, such a heat press would be economical only in high through-put and volume applications.

Although high volume through-put devices are known, a large hobbyist and home-based business market segment has developed for artistic consumer products. This market has been greatly expanded by the advent of internet-based sales channels such as etsy.com. Because the market for these items may be difficult to predict, a heat press has to be flexible in application to provide a viable means of producing these items. Many of these often home-based businesses would benefit from heat presses that are versatile in application and yet are not too expensive.

SUMMARY OF THE INVENTION

A need exists for a heat press device that is able to be closely controlled for relevant heat press conditions. For example, a good quality heat press product can be produced reliably if heat, time, and pressure conditions are carefully controlled. A heat press can be configured to precisely control for pressure for a single substrate or workpiece and a single transfer type in a facility producing only one type of article. However, such a press would not be flexible in application. A heat press can be equipped with sophisticated sensors to carefully control pressure across a range of substrate and transfer types to provide consistency of pressure conditions to enable a user to duplicate pressure conditions for different articles. However, such sensors may require careful calibration and maintenance and can greatly increase the cost of the heat press making it too costly for many potential users. Conventional heat presses without sensors attempt to provide consistency in pressure by a paper pressure test. The paper pressure test initially requires the platens be positioned such that a paper partially located between the platens would slip out when the platens are in the closed position. The paper pressure test then provides that the pressure be increased incrementally until the piece of paper between platens does not easily slip out when the platens are in the closed position. That relative platen position is considered to provide an appropriate pressure. Some users may also develop a feel for pressure. While these approaches to controlling pressure can provide adequate results, there is a need for a heat press that can accurately provide pressure conditions for a variety of articles without requiring expensive sensors while also providing an indicator to signal to the user that the pressure condition is as desired. Such a heat press can eliminate less clear techniques, such as the paper pressure test, when switching between different types of articles while still providing excellent pressure control for a range of articles. Such a heat press would be highly desired by the home-based and internet sales segment of the heat press market.

In one embodiment a heat press device is provided that includes a support structure, a lower platen and a heating element assembly. The lower platen can be coupled with the support structure. The lower platen can be configured to support a workpiece and a transfer material. In some cases, the lower platen is a first platen, e.g., it may be located to a side position or above another platen and not necessarily below or lower than another platen. The heating element assembly can include a heating element and an upper platen. The upper platen can be a second platen, e.g., it may be located to a side position or below another platen and not necessarily above or over another platen. The heat press device also can include a mechanism to provide relative motion between the first and second (or the lower and upper) platens. Relative motion between the first (e.g., the lower) platen and the second (e.g., the upper) platen of the heating element assembly enable the heat press device to be in an open configuration to provide access for the workpiece and the transfer material and in a closed configuration to apply pressure to the workpiece and the transfer material. The heat press device can further include a movement assembly configured to change a pressure state between the first (e.g., the lower) platen and the second (e.g., the upper) platen of the heating element assembly when the heat press device is in the closed configuration. The heat press device can also include an indicator that is configured to convey the pressure state between the first (e.g., the lower) platen and the second (e.g., the upper) platen when the heat press device is in the closed configuration.

The indicator can convey a pressure state as a function of relative position of a platen that is moved by the movement assembly. A mechanical position can be made observable directly or indirectly. An indirect mechanical position can be observed using a counter coupled to detect rotation of and therefore advancement of a load plate. An indirect mechanical position can be observed by way of a location of a pointer along a scale or a relative position of a component coupled with a load plate of the heat press.

In other cases a textual output can provide visual cue as to an indirect measure of pressure between two platens. A numerical output, e.g., digital or analog, can provide visual cue as to an indirect measure of pressure between two platens. A graphical output, e.g., a color or a symbol, can provide visual cue as to an indirect measure of pressure between two platens. An audio output can provide an audible cue as to an indirect measure of pressure between two platens. A tactile output can provide an audible cue as to an indirect measure of pressure between two platens. Any combination of the foregoing outputs as to an indirect measure of pressure between two platens can be provided to control a heat press. The indicator can provide a simple output that conveys to the user the pressure state without requiring a load sensor or other complex and expensive electronic components.

In another embodiment, a heat press pressure control apparatus is provided that includes a movement assembly configured to be coupled to one or more of a first platen of a heat press, a second platen of a heat press, and a support structure of a heat press coupled with the first platen or the second platen. The movement assembly has a threaded recess, a threaded member threaded into the threaded recess, and an actuator configured to provide rotation between the threaded member and the threaded recess. The movement assembly thereby changes a separation condition of the movement assembly. The heat press pressure control apparatus also includes an indicator configured to convey a pressure state resulting from the separation condition.

In a further embodiment, a heat press pressure control apparatus is provided that includes a housing, a bracket and a coupler. The housing at least partially enclosing a cylindrical member and a user output device disposed on an exposed face thereof. The cylindrical member is journaled for rotation on or in the housing. The housing also at least partially encloses a rotation counter configured to detect rotation of the cylindrical member and to output to the user output device an indication of a pressure state related to the rotation of the cylindrical member. The bracket is configured to secure the housing to an arm or a column of a heat press device. The coupler is configured to couple the cylindrical member journaled for rotation in the housing to a platen adjusting actuator. The coupler causes the cylindrical member to rotate when a platen adjusting actuator of a heat press device is rotated.

In another embodiment, a heat press pressure control apparatus is provided that includes a means for determining a pressure state, such as a position of or a change in position of first and second platens relative to each other when the first and second platens are in an open configuration. The heat press control apparatus also includes an indicator configured to convey a pressure state resulting from the separation condition. The heat press control apparatus can be secured to an existing heat press device to provide by the functionality to an installed customer or to existing inventory by retrofit.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION OF THE PREFERRED EMBODIMENT

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application discloses configurations of heat press devices and components therefor that provide for control of a pressure state between two platens and an indicator to help a user achieve an operating condition. In some cases, the pressure state control is by way of detecting the actual height of a platen or one or more components that have a height related to the relative position between platens. These measurements can be closely related to pressure as to provide a functional alternative to actually sensing or directly measuring pressure. SECTION I discusses heat press devices that are able to control and convey pressure states between platens without requiring expensive or complex load sensors. SECTION II discusses a heat press control apparatus that can be coupled with heat press devices to enable such devices to control and convey pressure states between platens without requiring expensive or complex load sensors.

I. Heat Press Device with Pressure State Control

Figure 1:
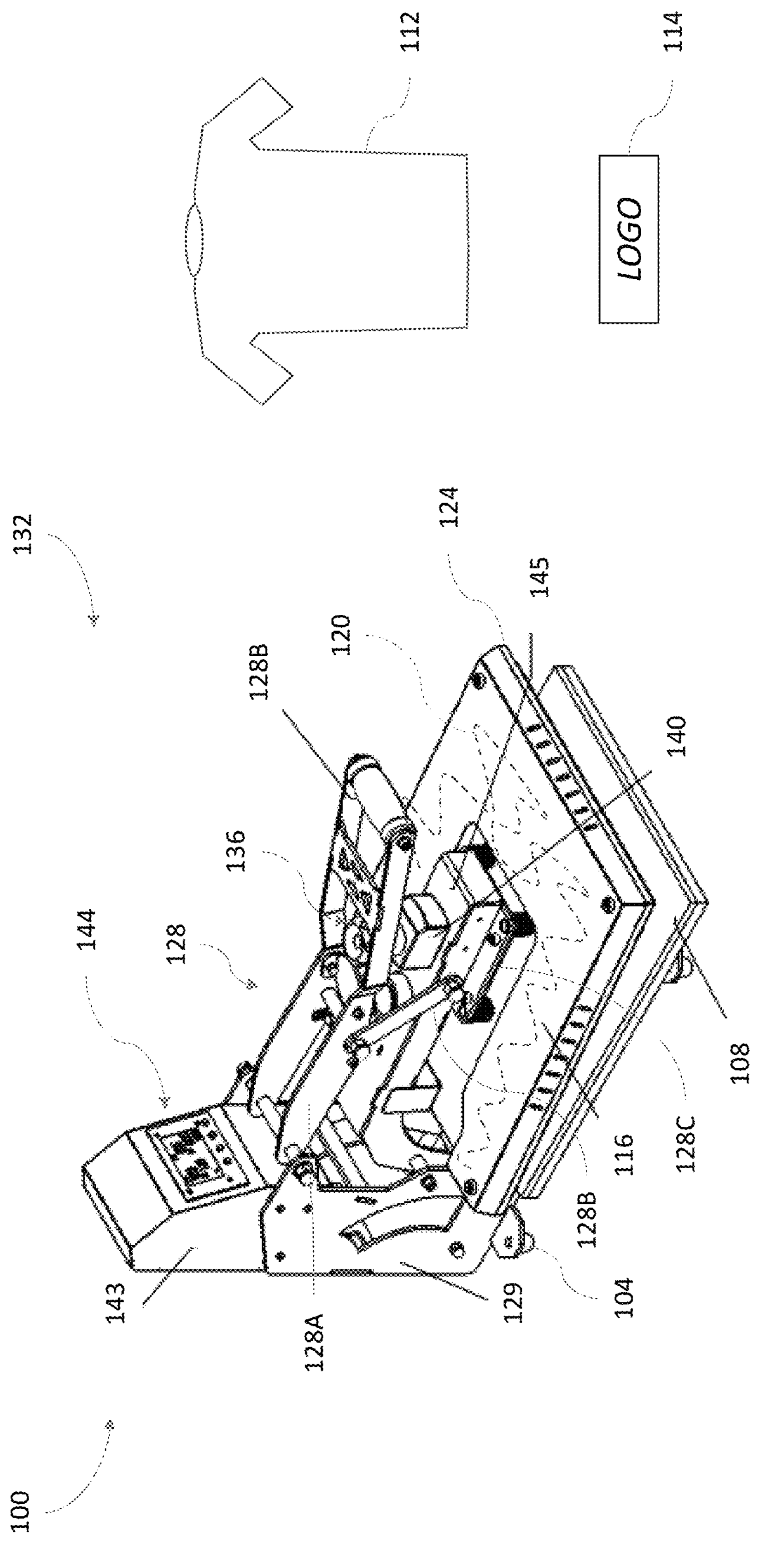
FIG. 1 is a perspective view of a heat press device according to one embodiment.

FIG. 1 illustrates features of a heat press device 100 as claimed herein. The heat press device 100 includes a support structure 104 that can be placed on a table or other convenient locating structure. The support structure 104 can include bolt apertures for securing the heat press device 100 to the table or locating structure. The support structure 104 can include rubber feet to enable the heat press device 100 to sit on a surface without damaging the surface. The heat press device 100 can include a lower platen 108 coupled with the support structure 104. The lower platen 108 is configured to support a workpiece 112 and a transfer material 114. The lower platen 108 can include a rigid plate and a silicon pad, the silicon pad being somewhat compressible but able to compress the workpiece 112 and the transfer material 114 between the rigid plate and another rigid structure of the heat press device 100.

The heat press device 100 also includes a heating element assembly 116 that has a heating element 120 and an upper platen 124. The upper platen 124 can provide a rigid structure against which the lower platen 108 can act. The heating element assembly 116 can comprise any suitable structure for heating the upper platen 124, such as by providing a high resistance conductor that increases in temperature as current is passed therethrough. The upper platen 124 can have a lower surface that faces an upper surface of the lower platen 108, in some cases the silicon pad. These surfaces can be separated from each other in an open configuration 132 (shown in FIG. 1) and brought close together or even touching in a closed configuration. The closed configuration provides that lower platen 108 to be very close to or in contact with the upper platen 124. Movement from the open configuration 132 to the closed configuration and from the closed configuration to the open configuration 132 can be a simple movement along an arc, e.g., when the heat press device 100 has a clamshell configuration. In some variations, a heating element assembly can also rotate about a vertical axis to be disposed to a side of the lower platen 108 and then to be moved back to a position over the lower platen 108, e.g., in a swing away configuration. The swing away configuration then operates by moving straight down rather than over an arc as in a clamshell arrangement. The improvements herein can apply to both clam-shell and swing-away style heat presses, by providing pressure control and an output to the user confirming the pressure state in each case. In another embodiment, the open configuration 132 is one in which the lower platen 108 is moved, e.g., slides, out from under the upper platen 124 in manner similar to a drawer. Movement from the closed to the open configuration 132 can be achieved automatically or manually when a heat press operation is complete.

The open configuration 132 enables the workpiece 112 and the transfer material 114 to be moved into a space disposed between the upper surface of the lower platen 108 and the lower surface of the upper platen 124. The workpiece 112 and the transfer material 114 can be placed on the upper surface of the lower platen 108. The workpiece 112 and the transfer material 114 can be placed on a silicon pad of the lower platen 108. The lower surface of the upper platen 124 can then be brought into contact with one or both of the workpiece 112 and the transfer material 114 to provide a selected pressure state between the lower platen 108 and the upper platen 124, as discussed further below.

Although the platen 108 is illustrated as below the platen 124 of the heating element assembly 116, other configurations are possible. For example, the spatial orientation can be modified such that the platen 108 is not lower than or below the platen 124. The platens 108, 124 can be side-by-side in some embodiments. The heating element assembly 116 can be disposed below the platen 108, such that the platen 124 is lower than the platen 108. Also, a heating element 120 can be disposed in an assembly including the platen 108 instead of or in addition to the heating element 120 in the assembly including the platen 124. Due to these variations, the lower platen 108 can be a first platen and the upper platen 124 can be a second platen or the upper platen 124 can be a first platen and the lower platen 108 can be a second platen. Also, the platens 108, 124 need not necessarily have a flat plate configuration. The platens could be curved to act on a curved workpiece, such as a cup, mug, or cap.

As noted above, the relative positions of the lower platen 108 to the upper platen 124 can change during the use of the heat press device 100. During use, the heat press device 100 can be in the open configuration 132 as shown in FIG. 1 to provide access to the space provided between the lower platen 108 and the upper platen 124 such that the workpiece 112 and the transfer material 114 can be positioned in that space. The heat press device 100 includes a mechanism 128 to provide relative motion between the lower platen 108 and the upper platen 124 of the heating element assembly 116 to enable the heat press device 100 to be moved to the closed configuration from the open configuration 132. In the closed configuration the heat press device 100 applies pressure to one or both of the workpiece 112 and the transfer material 114. In a swing-away type heat press device, the mechanism 128 can provide the open configuration 132 by both separating the platens vertically from each other but also by rotation about a vertical axis such that the lower platen 108 is not covered by the upper platen 124. Advantageously the pressure that is applied is carefully controlled by a low cost and simple configuration, making the heat press device 100 suitable for home based consumers and other users benefitting from flexibility in selection of the nature of the workpiece 112 and the transfer material 114. As is discussed further below, the heat press device 100 enables improved control of a pressure state in the closed configuration, e.g., by enabling simple selection and visual confirmation of the pressure state.

In one embodiment, the configuration control mechanism 128 of the heat press device 100 includes a linkage 128A that can raise and lower the upper platen 124. The linkage 128A can include one or more bars or links, e.g., a first pair of bars pivotably coupled to a frame 129 secured to the support structure 104. The frame 129 and/or support structure can be considered, alone or together, to be a pedestal supporting other components of the heat press device 100. A handle 128B can be coupled with pivotable bars of the linkage 128A. The handle 128B can move pivotable bars down and can apply a load to the heating element assembly 116, e.g., to the heating element 120, to the upper platen 124 or to both of the heating element 120 and the upper platen 124. The handle 128B can move pivotable bars to apply a load to a load plate 128C via another pair of bars of the linkage 128A. As discussed further below, the heat press device 100 can include an arm 145 that is pivotable relative to the frame 129. The load plate 128C can be coupled with the upper platen 124, e.g., with a top surface of the heating element assembly 116 which includes the upper platen 124. The load plate 128C can be coupled to and extendable from the arm 145 to alter a pressure state in the space between the lower platen 108 and the upper platen 124.

Figure 5:
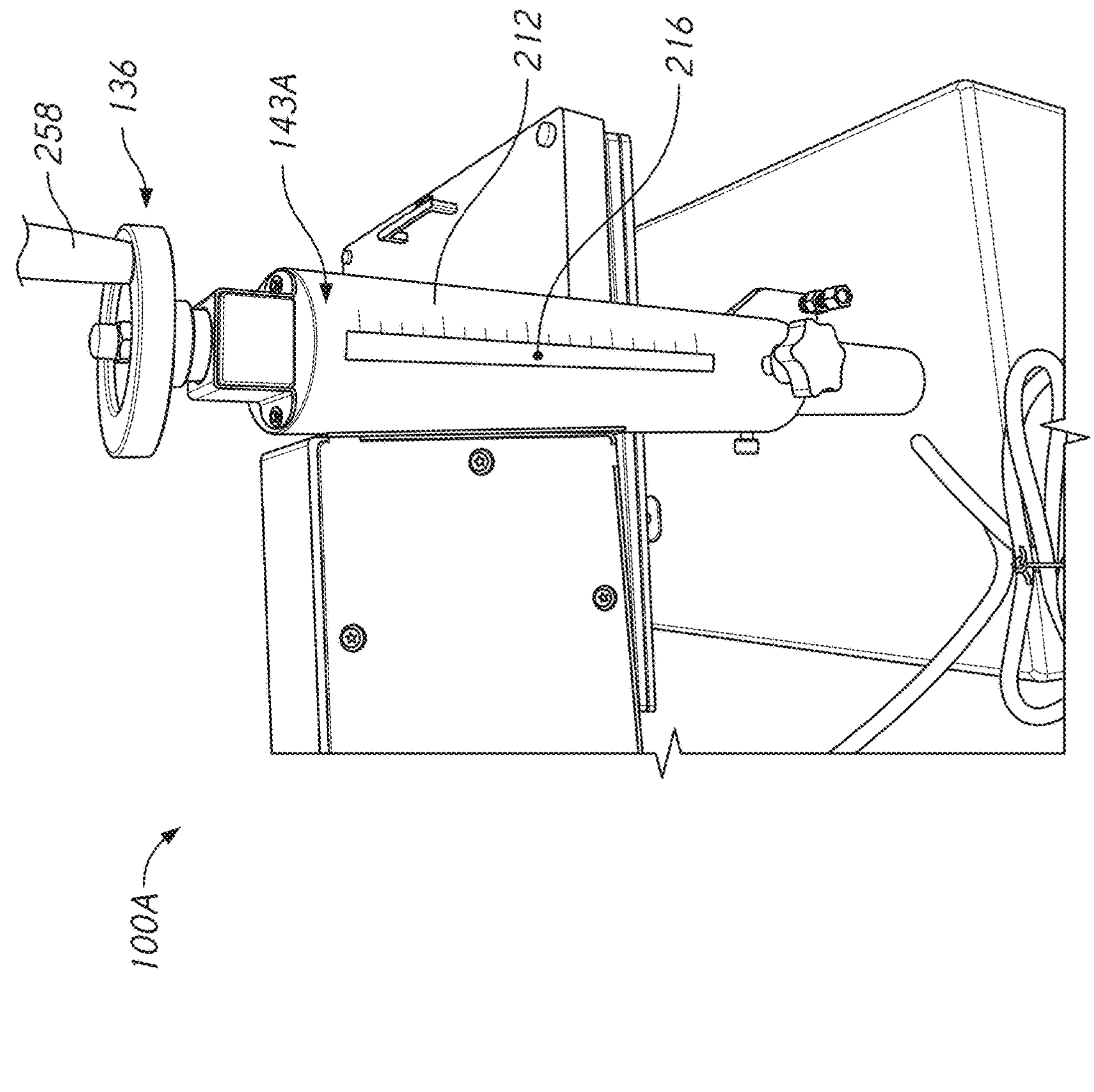
FIGS. 5-8 shows additional embodiments of an indicator that can be directly integrated into a body of a support of a heat press device.

The heat press device 100 includes a movement assembly 136 that is configured to change the pressure state between the lower platen 108 and the upper platen 124 of the heating element assembly 116 when the heat press device is in the closed configuration. The movement assembly 136 can include a manual position adjusting device. In other words, the movement assembly 136 allows the user to select how much pressure is applied to the workpiece 112 and/or the transfer material 114. Importantly, the pressure state that is selected can be accurately predicted and the pressure state can be clearly conveyed to the user by the heat press device 100. The movement assembly 136 can be mounted on or to the arm 145 of the heat press device 100 that is disposed over the heating element assembly 116 and to which the load plate 128C is coupled. In a modified embodiment, the movement assembly 136 is integrated into a swing-away format heat press. For example, in the heat press device 100A of FIG. 5 the movement assembly 136 is disposed at an upper portion 143A of a column that is adapted to enable the upper platen thereof to rotate out of the work zone, e.g., about a vertical axis of the column. The movement assembly 136 can adjust the position of the platens by movement induced upon rotation of a threaded rod in the column. Further details of the movement assembly 136 are discussed below in connection with FIGS. 2-3 and FIG. 5.

The heat press device 100 also includes an indicator 140. The indicator 140 can be located at an upper portion 143 of the heat press device 100 on the frame 129 secured to the support structure 104. The indicator 140 can be configured as part of a user interface portion 144. The user interface portion 144 can be an interface that provides information about one or more operational states of the heat press device 100. The user interface portion 144 allows the user to input and see displayed a selected temperature for the heating element 120 or upper platen 124. The user interface portion 144 can include a timer function by which the user can determine how long the heat and pressure will be applied. A timer function can also include a count-down to help the user know when the heat press operation will conclude. The timer function of the heat press device 100 can be set independently of other variables of the heat press device 100. The timer function of the heat press device 100 can be selected based on one or more of a temperature setting, the position of the movement assembly 136, and/or an input indicating the workpiece 112 and the transfer material 114 of the heat press device 100.

In one embodiment, the indicator 140 is not part of the user interface portion 144. For example, the indicator 140 can be located on or coupled to the arm 145 of the heat press device 100. The indicator 140 can be a component of or coupled with the movement assembly 136. The indicator 140 can be located adjacent to the movement assembly 136, whether it is on the arm 145 or on another portion of the heat press device 100. In some embodiments, the indicator 140 includes an output that shows or can be predictive of a pressure state. The pressure state can be shown or predicted from the position or configuration of the movement assembly 136. The indicator 140 can be disposed on a common housing with an actuator or other components of the movement assembly 136. As discussed above, the position of the movement assembly 136 can include a number of turns of a threaded member which corresponding to a linear position of the load plate 128C relative to one or both of the lower platen 108 and the upper platen 124.

Figure 2:
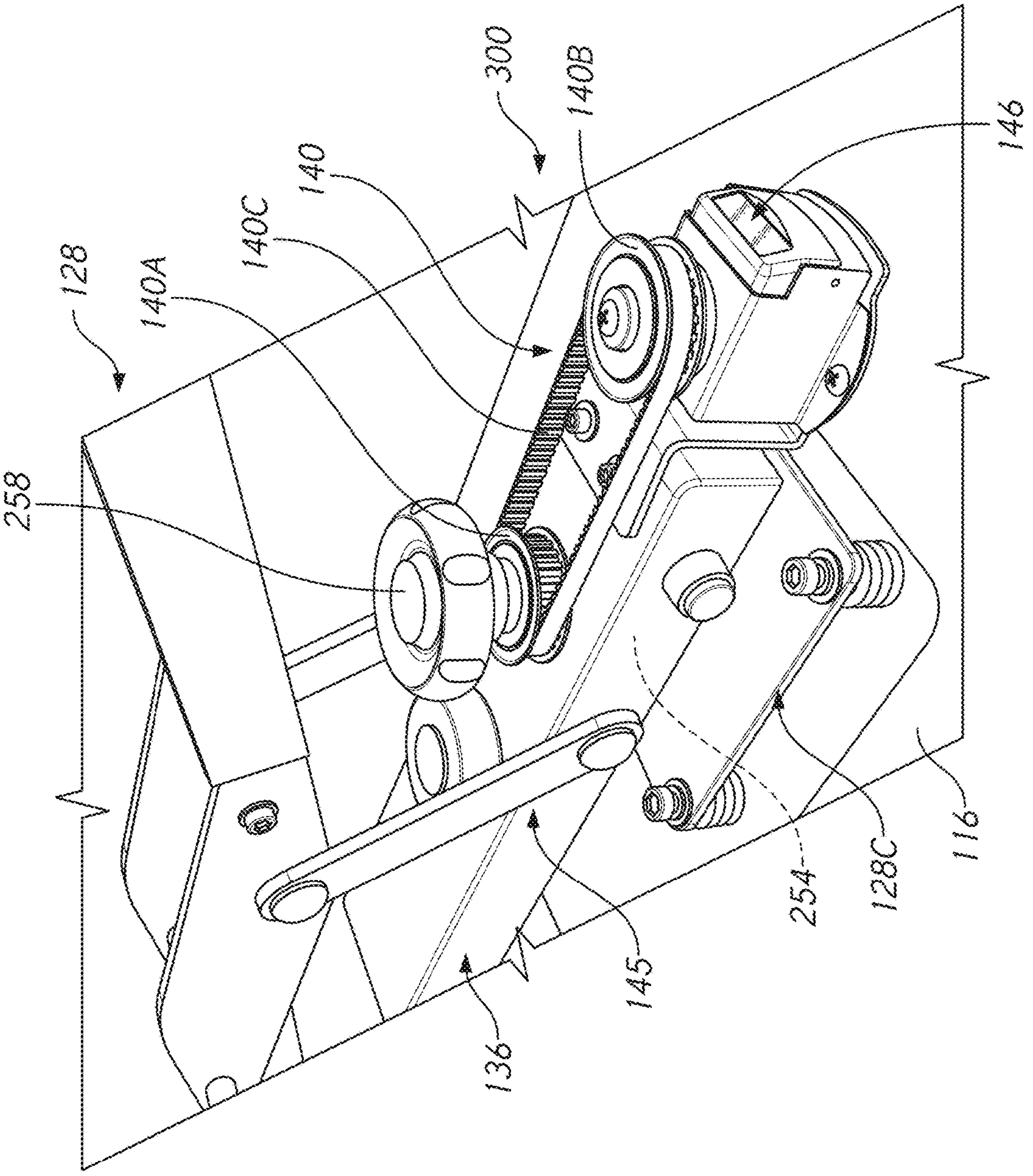
FIG. 2 is a detail view of one embodiment of a movement assembly and indicator for setting and conveying a pressure state of the heat press device of FIG. 1.

FIG. 2 shows further details of one embodiment of the movement assembly 136 and of the indicator 140. The movement assembly 136 can include a threaded member 254 and an actuator 258. The actuator 258 can include a wheel to be gripped by hand to adjust the movement assembly 136 in one embodiment. The threaded member 254 can be located inside the arm 145 and hence is not visible in FIG. 2. The actuator 258 is accessible, e.g., on a top side of the arm 145. The threaded member 254 can extend through the arm 145 and into driving contact with the load plate 128C. For example, the movement assembly 136 includes a rack 250. The actuator 258 can provide relative rotation between the threaded member 254 and the rack 250. Such rotation can move the rack relative to the threaded member 254 in a vertical direction, e.g., to move the load plate 128C toward the lower platen 108. Such movement can change the pressure state between the lower platen 108 and the upper platen 124 of the heating element assembly 116 when the heat press device 100 is in the closed configuration. More particularly, each rotation of the actuator 258 can move the rack 250 and thereby the load plate 128C toward or away from the lower platen 108. This movement can be detected by the indicator 140 to provide a clear and simple visual indication to the user of the pressure state. Any other configuration can be provided in which movement of an input device, such as the actuator 258, causes vertical translation of the load plate 128C to modify a pressure state between the lower platen 108 and the upper platen 124 when the heat press device 100 is in the closed configuration. For example, one or both of the lower platen 108 and the upper platen 124 can be configured such that the platen itself may rotate. Such a platen may be coupled with a thread mechanism so that as the platen rotates the elevation of the platen changes. Such an arrangement is within the scope of the movement assembly 136. In such other embodiments, the indicator 140 is configured to detect and output an indication of pressure state. Other configurations are discussed further below.

FIG. 2 also shows one embodiment of the indicator 140. In this embodiment, the indicator 140 is able to detect motion of the threaded member 254 and/or the rack 250 under control of the movement assembly 136. The indicator 140 can include first and second pulleys 140A, 140B and a belt 140C. The pulley 140A can be coupled with the actuator 258 of the movement assembly 136 for one-to-one rotation such that one rotation of the actuator 258 provides a corresponding one rotation of the pulley 140A. The rotation of the pulley 140A can cause a same rotation of the pulley 140B by virtue of the belt 140C that is mounted on the pulleys 140A, 140B. This enables a user interface 146 responsive to rotations of the pulley 140B to display information to the user regarding a pressure state. In one example, the user interface 146 can output information on a counter disposed in the indicator 140. The counter can count revolutions of the movement assembly 136 by virtue of rotation of the pulley 140B, driven by the belt 140C, driven by the pulley 140A. The pulley 140B can be configured to rotate the same number of revolutions as the pulley 140A. A gear ratio could be provided between the pulley 140A and the pulley 140B which would be factored into a counter display on the user interface 146. In one embodiment, the rotation of the pulley 140A corresponds to, e.g., is the same number of revolutions as, the movement assembly 136.

If a user wants to enhance the pressure state of the heat press device 100 the movement assembly 136 can be operated, e.g., the actuator 258 rotated one revolution, and the user interface 146 may display "1". From experience of use with the heat press device 100 the user can determine that a setting of "1" provides excellent results for a certain workpiece 112 and transfer material 114 at a certain time and temperature. If more pressure is desired, the movement assembly 136 can be operated, e.g., the actuator 258 rotated until the user interface 146 displays "5" for example. The setting "5" my correspond to a much higher pressure state than the setting "1" to provide best results for a different combination of the workpiece 112, transfer material 114 at a selected time and temperature. The direct mechanical output of the illustrated embodiment of the movement assembly 136 provides an immediate, reliable indication of these and other pressure state without requiring any electronic sensors or detectors.

The pulley 140B can be journaled on a housing that also contains the user interface 146. The pulley 140A can be configured to mount to an adjusting screw of a conventional heat press device to provide a heat press pressure control apparatus that can be easily installed by an end user. Accordingly these components can be part of a unit, as discussed further below in Section II.

Figure 2A:
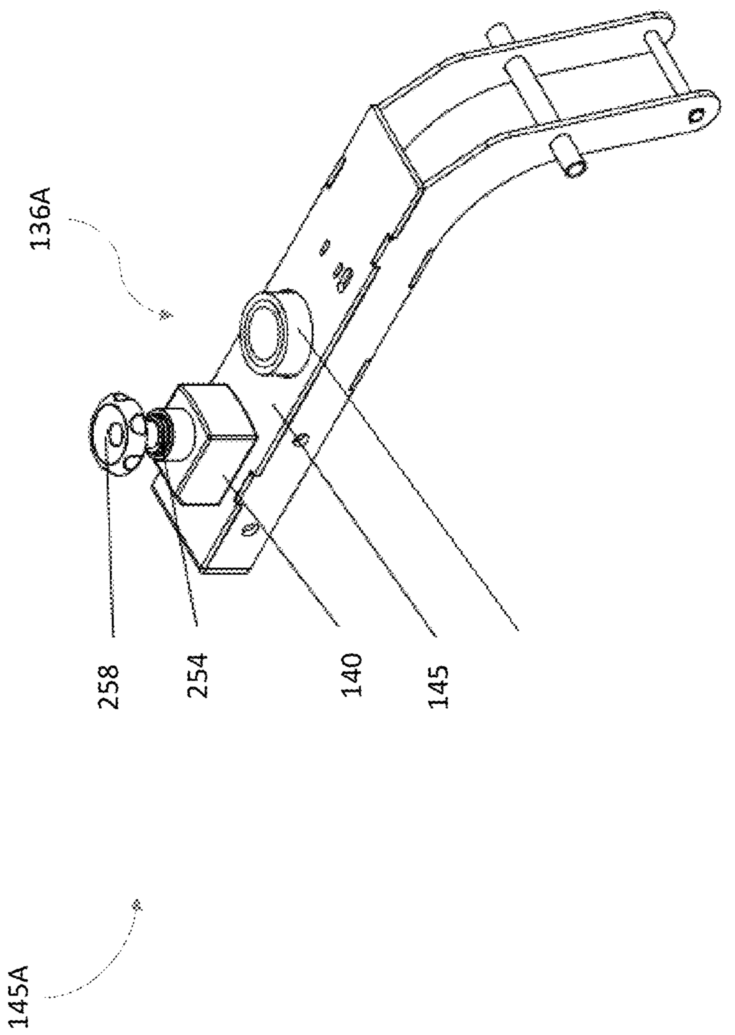
FIG. 2A shows a modified embodiment of FIG. 2 wherein an actuator of a movement assembly is mounted directly to a housing of an indicator.

FIG. 2A discloses a modified embodiment of the heat press device 100. The description of the components of the heat press device 100 set forth above are fully applicable in that the arm assembly 145A can be integrated into the other components of the heat press device 100. In this embodiment, an arm assembly 145A is provided that can be integrated into the heat press device 100. The arm assembly 145A provides the indicator 140 having the actuator 258 journaled thereon. The actuator 258 is configured to drive a mechanism to turn the threaded member 254 disposed away from the actuator 258. The actuator 258 and the threaded member 254 can be coupled with a belt and pulley mechanism as discussed above in connection with FIG. 2. The threaded member 254 can be coupled with a rack 250 disposed inside the arm 145 of the arm assembly 145A. The modification illustrated by FIG. 2A beneficially hides the belt and pulleys (or other mechanism) and also allows the actuator 258 to be located closer to the user to be more accessible.

Figure 3:
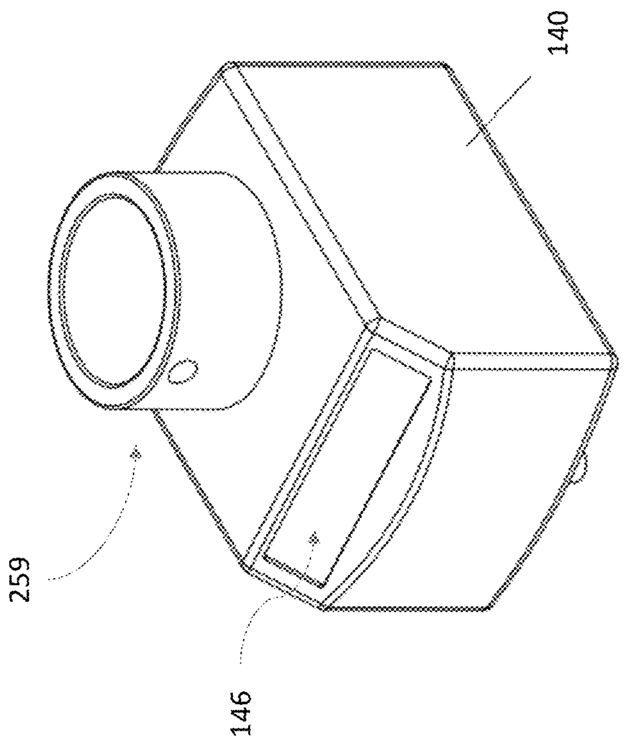
FIG. 3 is one embodiment of an indicator having a readout on a face thereof.

FIG. 3 shows the indicator 140 in more detail. As shown, the indicator 140 can include a housing that has the user interface 146 disposed thereon. The indicator 140 can also include a position detector input 259 that can be coupled with a component or apparatus to enable the indicator 140 to detect or count the motion of the movement assembly 136 such that a relative position of the load plate 128C and the lower platen 108 can be determined.

Figure 4:
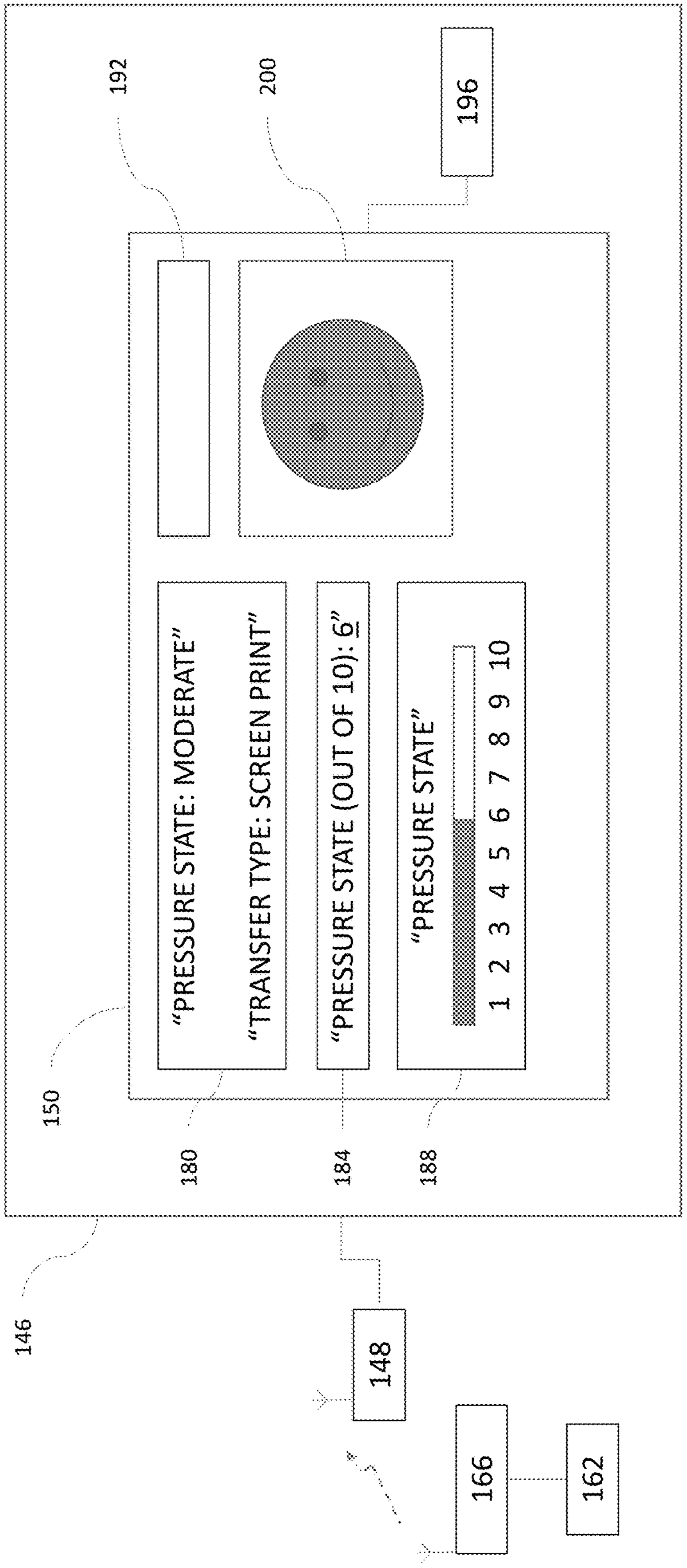
FIG. 4 shows various embodiment of a user interface of an indicator that can provide a user with information about a selected pressure state.

FIG. 4 shows further details of various components of the indicator 140 and embodiment of the user interface 146. As noted above, the user interface 146 can include a counter that can count rotations of the actuator 258 of the movement assembly 136 in order to give the user an indirect but very straight-forward indication of the pressure state in the space between the lower platen 108 and the upper platen 124 when the heat press device 100 is in the closed configuration. In certain modified embodiments, the pressure state can be registered in any one or a plurality of features of the user interface 146. The user interface 146 can have one or more windows or functions to communicate the pressure state to the user. The heat press device 100 comprises a processor 148. The 148 and the indicator 140 can comprise a user interface 146, as discussed above. The user interface 146 can have one or a number of sections or windows to convey information.

A display 150 can provide enhanced or different information to a user on the user interface 146. The display 150 configured to receive signals from a processor 148. The processor 148 can be configured to process a signal indicative of the pressure state between the lower platen 108 and the upper platen 124. The processor 148 can output a signal to drive a visual representation of the pressure state on the user interface 146. The processor 148 can be configured to receive signals from another component of the heat press device 100. The signals can be based on output of a sensor. A sensor can provide an indirect measurement of a pressure state. For example, the processor 148 could receive an electrical signal indicating revolutions of the actuator 258 of the movement assembly 136. The processor 148 could receive an electrical signal indicating position of the rack 250 based on the position being detected by a linear position sensor 162.

The processor 148 can be wired to a sensor or another signal source in some embodiments. In other embodiments, a wireless signal can be received by the processor 148. The linear position sensor 162 can output a signal that is conveyed by a transmitter, e.g., can be a wireless sensor signal. The linear position sensor 162 can generate a signal indicative of the pressure state and can convey the signal indicative of the pressure state to the processor 148. The linear position sensor 162 can be coupled with a wireless transmitter 166 disposed on the heat press device 100. The wireless transmitter 166 can be coupled with the linear position sensor 162 to wirelessly convey the signal indicative of the pressure state to the processor 148. The linear position sensor 162 can detect, directly or indirectly, the amount the load plate 128C has advanced by operation of the movement assembly 136. The linear position sensor 162 can convey that position information to the processor 148 by a wired connection or by the wireless transmitter 166. If the wireless transmitter 166 is used, the processor 148 includes or is coupled with a wireless receiver to receive that information and incorporate that information into the processing performed by the processor 148.

FIG. 4 illustrates great flexibility that can be provided in the display 150 of various embodiments of the user interface 146 of the indicator 140 to provide indications of the pressure state to the user. The display 150 can include a text output field 180 indicating the pressure state and, in some cases, other useful information. The text output field 180 can include text that does not directly state the pressure in the space between the lower platen 108 and the upper platen 124 but rather provides a qualitative indication of pressure, e.g., "Moderate" indicating higher or heavy pressure. The text output field 180 also can state what sort of workpiece 112 and transfer material 114 (e.g., heat transfer vinyl) would be suitable under the conditions set by the position of the movement assembly 136. In other words, as the actuator 258 is rotated to cause the load plate 128C to move toward the lower platen 108, the output in the text output field 180 can change from a first type of heat press procedure (e.g., "screen print", "sublimation") to a second type requiring more pressure. As the actuator 258 is rotated to cause the load plate 128C to move away the lower platen 108, the output in the text output field 180 can change from the first type of heat press procedure (e.g., "screen print", "sublimation") to a third type requiring less pressure. The text output field 180 can move from "Moderate" to another qualitative statement of the pressure state, e.g., to "Heavy", "Medium", or "Light".

FIG. 4 shows that the display 150 can have, in addition to or in place of the text output field 180, a digital readout field 184 that can provide a numerical indication of the pressure state of the heat press device 100 between the lower platen 108 and the upper platen 124 when the heat press device 100 is in the closed configuration. The digital readout field 184 can provide a numerical output that is along a scale, such as from "1" to "10". The scale can be calibrated to the configuration of the movement assembly 136 or position of the actuator 258. For example, rotating the actuator 258 can cause the load plate 128C to be advanced, e.g., to move closer to the lower platen 108, as discussed above. A sensor or other signal generating device can provide a signal to the processor 148 to provide a digital readout to a digital readout field 184. A readout of "1" can indicate a pressure state that is relatively low. A readout of "10" can indicate a pressure state that is relatively high. A readout of "6" can indicate a pressure state that is moderate. Specific readouts along this scale can be determined to correspond to good heat press performance for particular uses, e.g., for screen print at a particular temperature and time. The digital readout field 184 can be presented by itself or in combination with other aspects of the display 150 seen in FIG. 4. The digital readout field 184 provides the advantage of more discrete readouts that allow a user to more precisely identify proper pressures states using the movement assembly 136 and the indicator 140 without requiring expensive load sensors.

FIG. 4 further shows that the display 150 can include an analog readout 188 instead of or in combination with one or both of the text output field 180 and the digital readout field 184. The analog readout 188 can be in the form of a bar that illuminates from the left to a location corresponding to a level, for example from "1" to "10". In the illustrated figure the bar is solid from "1" to "6" indicating a level of "6". This output shows a moderate pressure. The analog readout 188 can visually show the pressure state at and in-between integer levels. The analog readout 188 can be a subtler indication of the pressure state than is provided with the digital readout field 184. The analog readout 188 could be combined with the digital readout field 184 to provide more fine information of the analog readout 188 to the user when needed and more discrete output of the digital readout field 184 when more discrete information is sufficiently detailed.

The display 150 can include a color output field 192. The color output field 192 is configured to display a color indicating a pressure state of the heat press device 100 resulting from operating the movement assembly 136. The actuator 258 can change the position of the lower platen 108 of the heating element assembly 116 relative to the upper platen 124. The color can indicate acceptable pressure on a workpiece 112 and/or a transfer material 114 when the heat press device 100 is in the closed configuration. The color output field 192 can be provided in addition to or in place of the output windows discussed above in connection between the display 150. The color output field 192 can display green when the pressure state is acceptable and another color, e.g., red or yellow, when the pressure state is not acceptable. In one case, red indicates that the pressure state is too high for the selected heat press operation and other operating conditions. The color yellow indicates that the pressure state is too low for the selected heat press operation and other operating conditions. The color output field 192 can instead be based on a correspondence to a particular workpiece 112 and a particular transfer material 114. For example, the color in the color output field 192 can be red for screen print at a particular temperature and time and can be yellow for another combination of workpiece, transfer type, at the same or a different time and temperature.

The display 150 can have an output that is graphical or symbolic in nature. The display 150 can include, in addition to the output forms discussed above, a graphical output field 200 that displays a graphical icon. The graphical output field 200 indicates that a pressure state, e.g., resulting from a separation between the lower platen 108 and the upper platen 124 of the heating element assembly 116 corresponds to acceptable pressure on a workpiece 112 and/or a transfer material 114 when the heat press is in a closed configuration. For example the graphical output field 200 can have a happy face symbol when the user configures the movement assembly 136 to arrange the load plate 128C or otherwise position the upper platen 124 relative to the lower platen 108 to provide appropriate or acceptable pressure when the heat press device 100 is in the closed configuration. Other symbols that could be displayed include a check mark, a thumbs-up, or another visual symbolic representation that the pressure state is appropriate. In some embodiments, the graphical output field 200 provide a different graphic for the workpiece 112 and the transfer material 114 types that are appropriate for a given temperature and time given the configuration of the movement assembly 136. In other words, the graphical output field 200 can display one of a plurality of images upon setting a temperature and time and further by setting the configuration of the movement assembly 136, e.g., by moving the actuator 258. The graphical output field 200 can show a symbol of a T-shirt for a screen print processing.

The user interface 146 can have a speaker 196 to communicate a pressure state to the user of the heat press device 100. The user interface 146 is configured to use the speaker 196 to provide an audio output indicating the pressure state such as by using a position of the upper platen 124 of the heating element assembly 116 relative to the lower platen 108. The speaker 196 can output audio indicating acceptable pressure on the workpiece 112 and/or transfer material 114 when the heat press is in the closed configuration. The speaker 196 can emit a sound such as a bell tone or a word such as "good". In some implementations the speaker 196 can emit a specific workpiece 112 and/or transfer material 114 (e.g., "Cotton T-Shirt" and "decal") or heat press process (e.g., "screen print") that would be successfully processed at selected temperature and time settings.

The user interface 146 can be configured to combine one or more types of outputs, including in various examples a visual output on any one or more of the display 150 and an audio output on the speaker 196. The outputs can be divided, for example providing an audio output of the workpiece 112 and transfer material 114 while visually displaying on the display 150 that the pressure state arising from operating the movement assembly 136 is acceptable. In other embodiments, the user interface 146 could also be configured to include a tactile feedback integrated into the movement assembly 136, e.g., into the actuator 258. The actuator 258 can be made to vibrate when the position of the actuator 258 is appropriate for a particular heat press process.

FIGS. 5-8 show a number of embodiments of a heat press device 100A in which a visual indication of a pressure state between the lower platen 108 and the upper platen 124 can be provided. The heat press device 100A is similar to the heat press device 100 except as described differently below. The heat press device 100A can be a swing-away style heat press device 100A that can operate to rotate one platen away from the other about a vertical axis such that the rotated platen is not over the other platen. The heat press device 100A includes an upper portion 143A that can have a cylindrical housing portion or column. The cylindrical housing portion or column can also house the mechanism that enables the rotation of one platen out of the workspace in a swing-away configuration. A scale 212 and a pointer 216 visible to a user can be provided on and in (respectively) the cylindrical portion of the upper portion 143A. The scale 212 can be formed along the outside surface of the upper portion 143A of the heat press device 100. The upper portion 143A can have a vertical, elongate slot forming the window. The scale 212 can be marked on an external surface of the upper portion 143A adjacent to the slot. The pointer 216 can be a high contrast member disposed in the slot or within inner surface of the cylindrical portion or column of the upper portion 143A of the heat press device 100A. The pointer 216 can be coupled with a portion of the movement assembly 136. For example, the pointer 216 can be coupled with a rack member disposed in the upper portion 143A. Rotation of the actuator 258 of the movement assembly 136 can move the rack up and down within the cylindrical portion or column of the upper portion 143A. This movement will move the pointer 216 a corresponding amount. The movement of the pointer 216 will cause the pointer 216 to be aligned with various graduations of the scale 212. The position of the pointer 216 will indirectly convey to the user the level of the pressure state based upon the operation of the movement assembly 136 for a particular heat press process.

Figure 6:
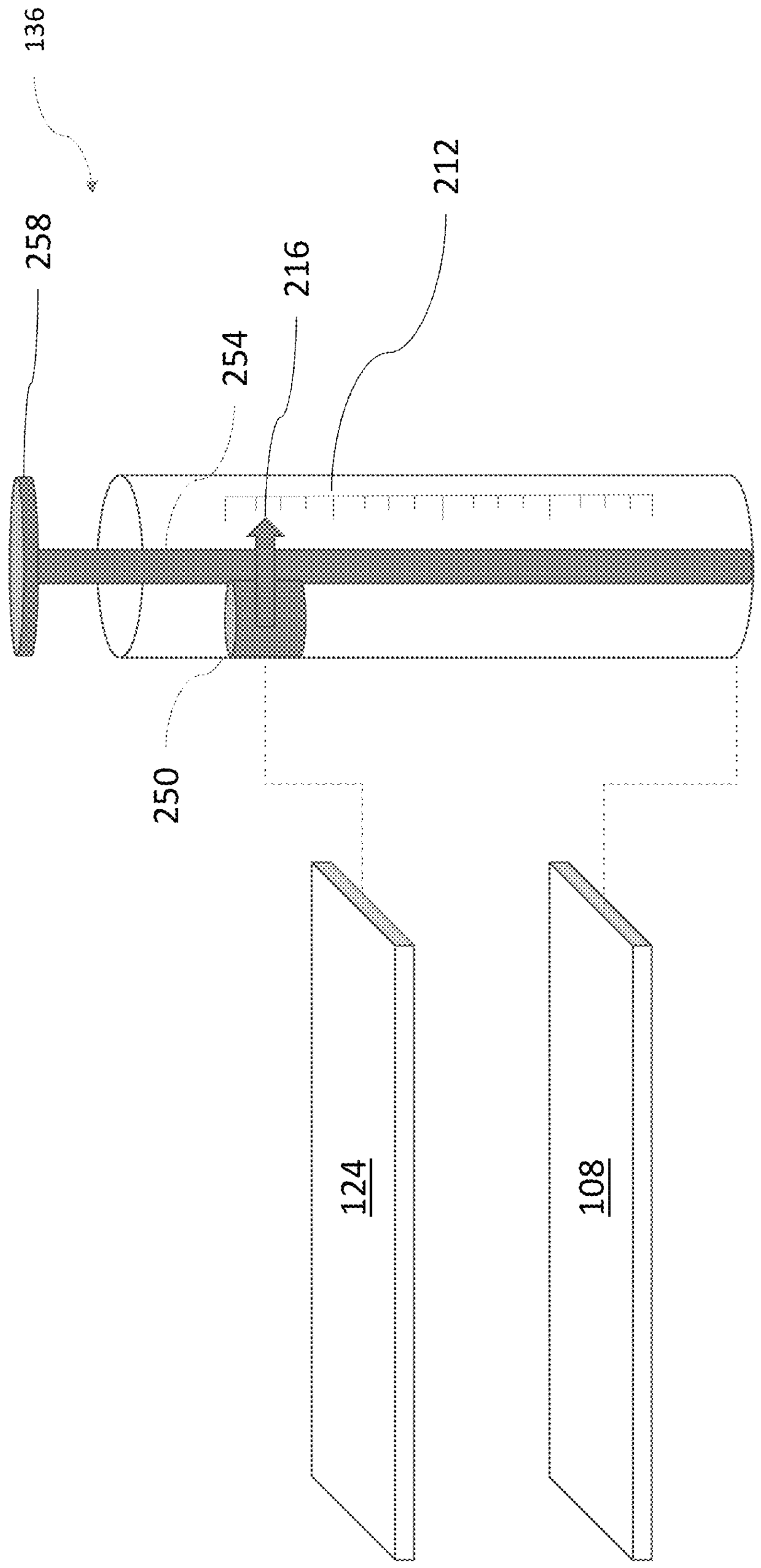

FIG. 6 shows the internal configuration of one variation of the heat press device 100A in more detail. The actuator 258 can be coupled with a threaded member 254. The threaded member 254 can be coupled with a rack 250. The actuator 258 is configured to provide relative rotation between the threaded member 254 and the rack 250. The rotation causes change the pressure state between the lower platen 108 and the upper platen 124 of the heating element assembly 116 to be altered. An opening formed in upper portion 143A of the support structure 104 of the heat press device 100A can enable viewing the pointer 216 which is coupled with the rack 250 and moveable with the rack 250 along or adjacent to the scale 212 to indicate a pressure state by pointing to the scale 212. The location of the pointer 216 indicates a separation between the lower platen 108 and the upper platen 124 and thus can be read to indicate the pressure state on the workpiece 112 and/or transfer material 114 when the heat press device 100 is in the closed configuration.

Figure 7:
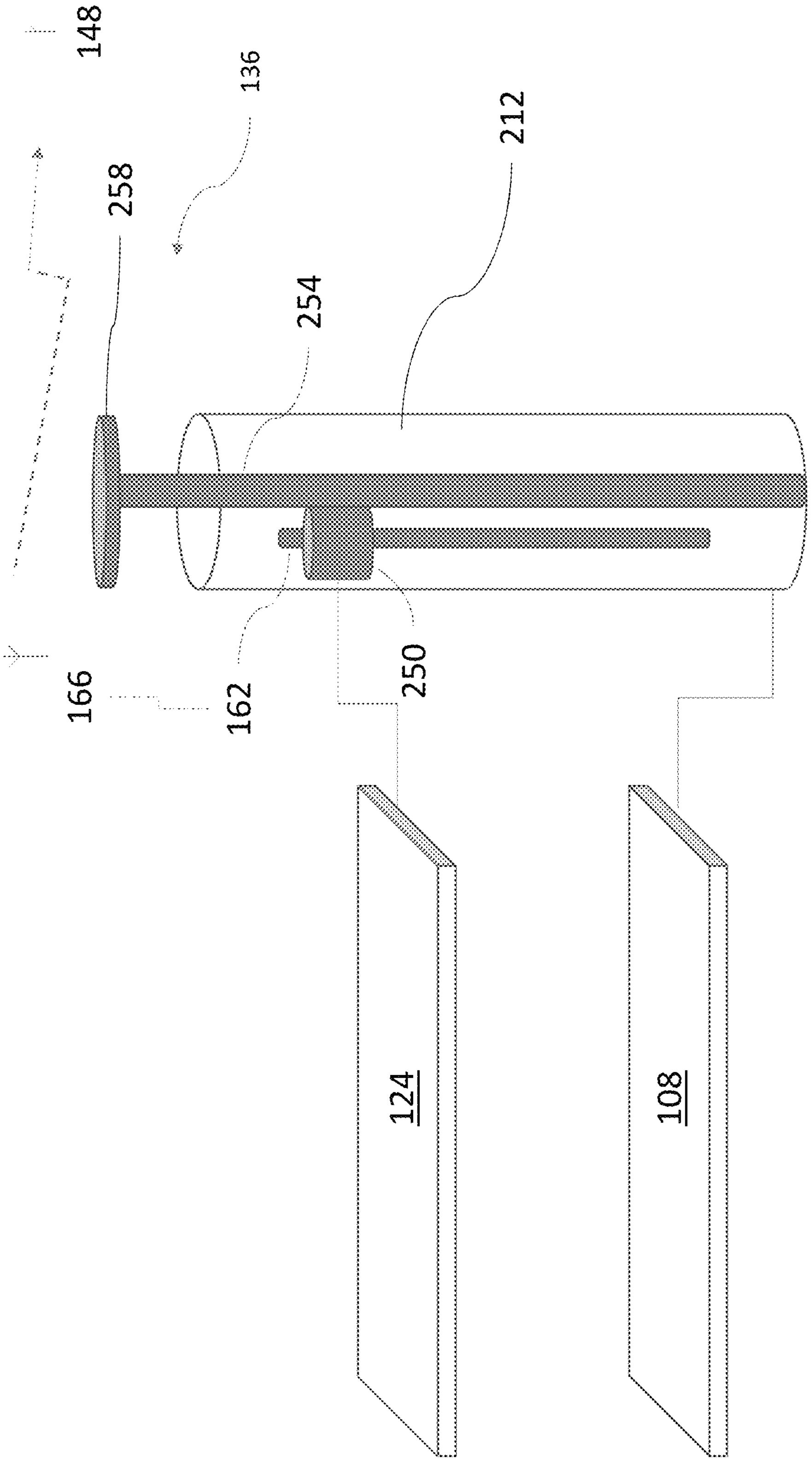

FIG. 7 illustrates further details of features discussed in connection with FIG. 4 in the context of the heat press device 100A shown in FIG. 6. Common disclosure will not be described again. The features of FIG. 7 also apply to the heat press device 100. The movement assembly 136 of FIG. 7 shows that the linear position sensor 162 discussed above can be positioned inside the upper portion 143A of the support structure 104 of the heat press device 100A. The linear position sensor 162 can be aligned over the range of motion of the rack 250. The linear position sensor 162 can be configured to sense the position of the rack 250. The sensed position can cause a signal to be generated by the linear position sensor 162. The signal can be conveyed to the processor 148 to provide an input for generating output signals, including any one or a combination of the outputs discussed above in connection with FIG. 4. The linear position sensor 162 can be coupled with the wireless transmitter 166 which is configured to convey the signals of the linear position sensor 162 to the processor 148. The signals so conveyed are received by a receiver in or coupled with the processor 148 as discussed above. The wireless signals are then processed to provide an indication of the pressure state, as discussed above.

Figure 8:
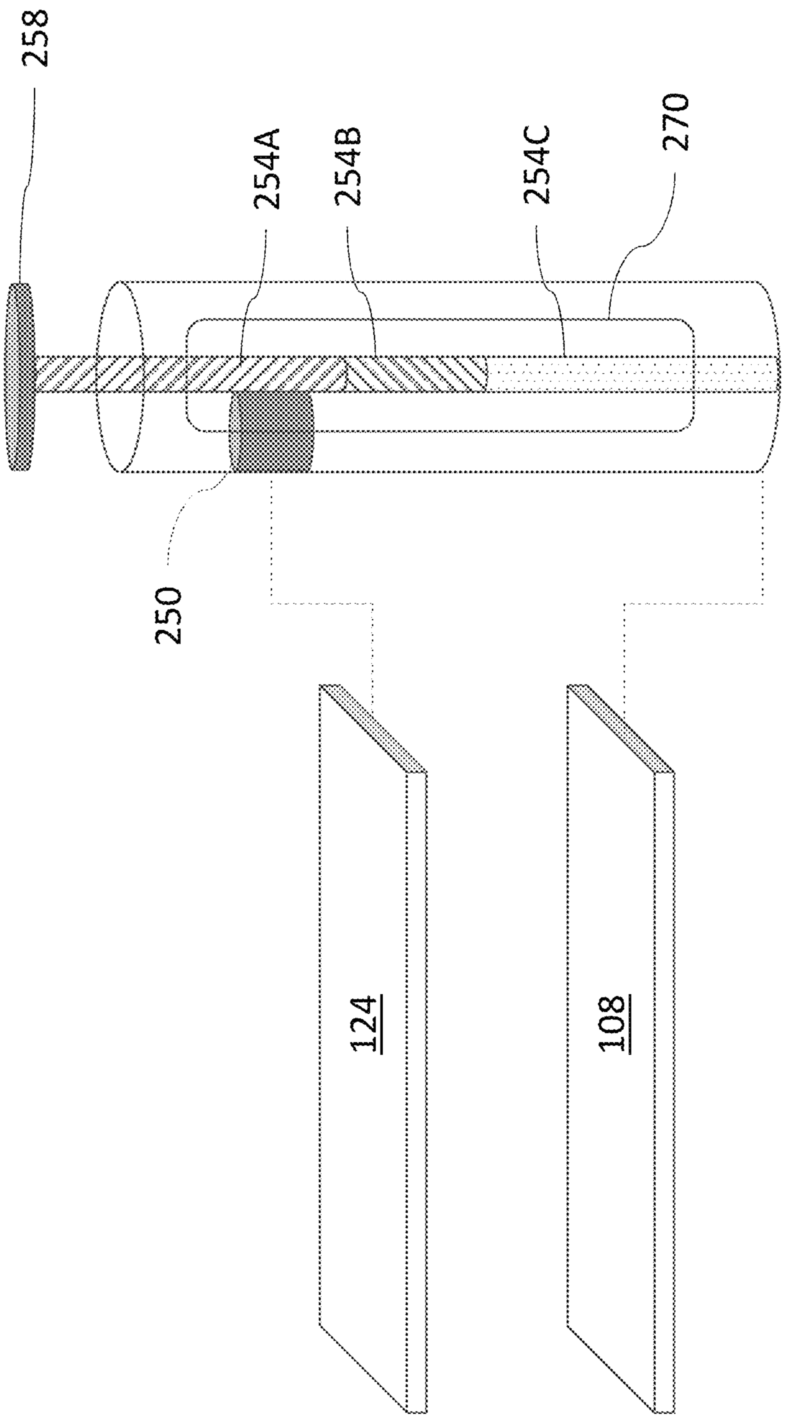
Figure 9:
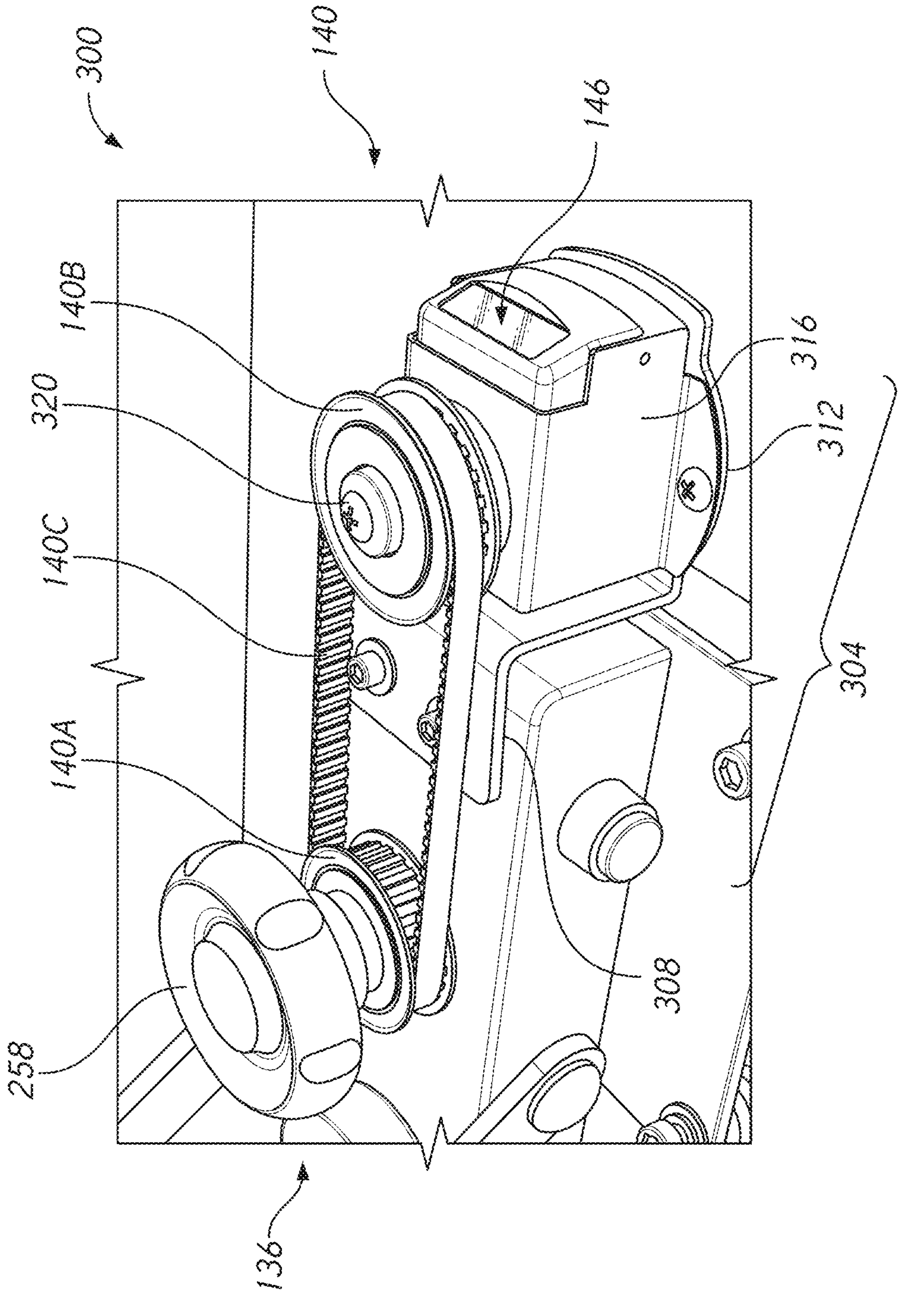
FIG. 9 is a perspective view of a heat press control apparatus that can be fitted to a heat press device.

FIG. 8 is a further modified embodiment in which the pressure state can be conveyed in a clear and simple manner. The description of common feature in FIG. 6 will not be described again. FIG. 8 shows that a window 270 can be provided in the upper portion 143A of the support structure 104 of the heat press device 100A. The window 270 can aligned with the threaded member 254 so that the threaded member 254 is visible therethrough. The threaded member 254 can have distinctive regions so that the position of the rack 250 relative to the threaded member 254 can be clearly seen. In one variation the threaded member 254 includes one or more colored lengths 254A, 254B, 254C. The position of the rack 250 along the one or more colored lengths 254A, 254B, 254C within the window 278 can indicate separation between the lower platen 108 and the upper platen 124 of the heating element assembly, the separation corresponding to pressure on the workpiece 112 and/or transfer material 114 when the heat press device 100 is in the closed configuration. The alignment of the rack 250 to the first colored length 254A can indicate a lower pressure state between the lower platen 108 and the upper platen 124. The alignment of the rack 250 to the second colored length 254B can indicate a moderate pressure state between the lower platen 108 and the upper platen 124. The alignment of the rack 250 to the third colored length 254C can indicate a higher pressure state between the lower platen 108 and the upper platen 124. Although three distinct and discrete locations are indicated on the threaded member 254 in other embodiments, more (e.g., four, five, six, seven, or more than seven) or fewer (e.g., only two) visually distinct regions are provided on the threaded member 254. The embodiment of FIG. 8 can also be applied on the heat press device 100 described above.

II. Modular Heat Press Pressure Control Apparatus

Although the technology described herein can be applied to a heat press, such as the heat press device 100 or the heat press device 100A, in other embodiments a heat press pressure control apparatus 300 can be provided. The heat press pressure control apparatus 300 is sometimes referred to as a heat press control apparatus 300 herein. The heat press pressure control apparatus 300 can include sub-components of the heat press device 100 for example.

The heat press pressure control apparatus 300 can include a support bracket 304 configured to enable the heat press pressure control apparatus 300 to be coupled with other components of the heat press device 100. The support bracket 304 can include a first end 308 configured to be secured to an outside surface of the heat press device 100, e.g., to the arm 145. The support bracket 304 can include a second end 312 disposed away from the first end 308. The second end 312 can be configured to support a housing 316 of the indicator 140. The housing 316 can have a lower portion configured to be secured to the second end 312 of the support bracket 304. The housing 316 can have an upper surface having a shaft 320 extending therethrough. The shaft 320 can be coupled with the pulley 140B. The pulley 140B can be coupled with the pulley 140A by the belt 140C.

As discussed above, the rotation of the actuator 258 of the movement assembly 136 can cause one-to-one rotation of the pulley 140A. The rotation of pulley 140A can cause rotation of the pulley 140B by the belt 140C. The rotation of the belt 140C can cause rotation of the shaft 320. The rotation of the shaft 320 can be counted by a counter disposed in the housing 316. Each revolution of the actuator 258 can be counted on the user interface 146 of the indicator 140 on the housing 316 can be incremented to provide user feedback of a pressure state of the heat press device 100 between the lower platen 108 and the upper platen 124.

In one case, the actuator 258 is a standard adjustment knob of a heat press. The pulley 140A is configured to be mounted to a standard shaft of the actuator 258. The pulley 140A can be positioned between the actuator 258 and the arm 145 of the heat press device 100. In some cases, an adapter is provided lengthen the shaft of the actuator 258 to enable the pulley 140A to be accommodated between the actuator 258 and the arm 145. The heat press pressure control apparatus 300 can be used to retrofit an existing heat press. The heat press pressure control apparatus 300 can be sold separately to allow end users to modify existing heat press devices such that they can provide enhanced control of a pressure state between a first platen, e.g., the lower platen 108, and a second platen, e.g., the upper platen 124.

Figure 10:
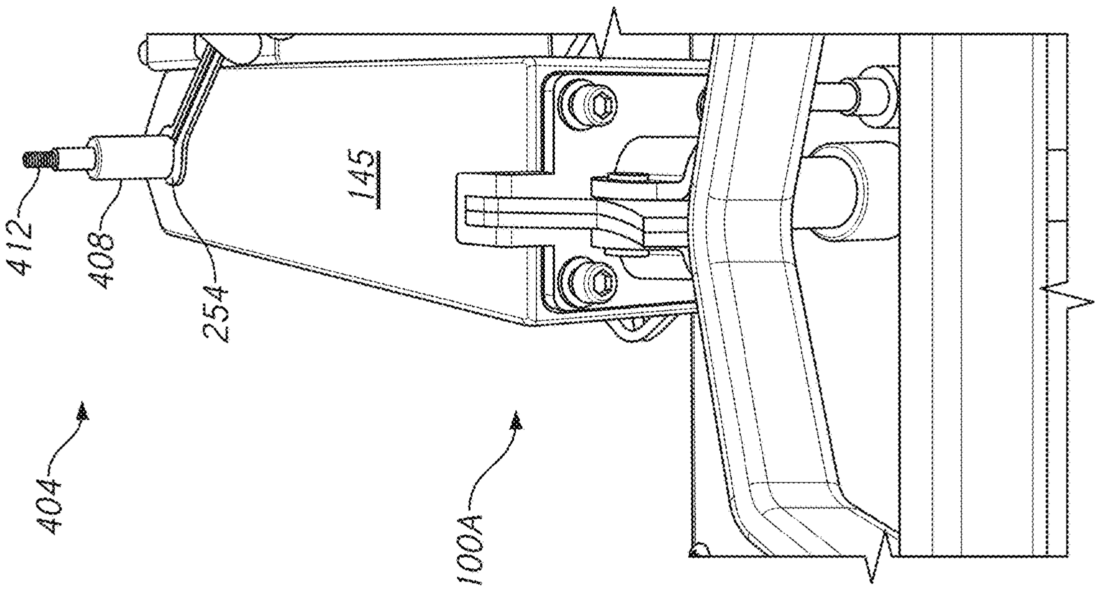
FIGS. 10-13 shows a heat press control apparatus and a method of applying the heat press control apparatus to a heat press device.
Figure 11:
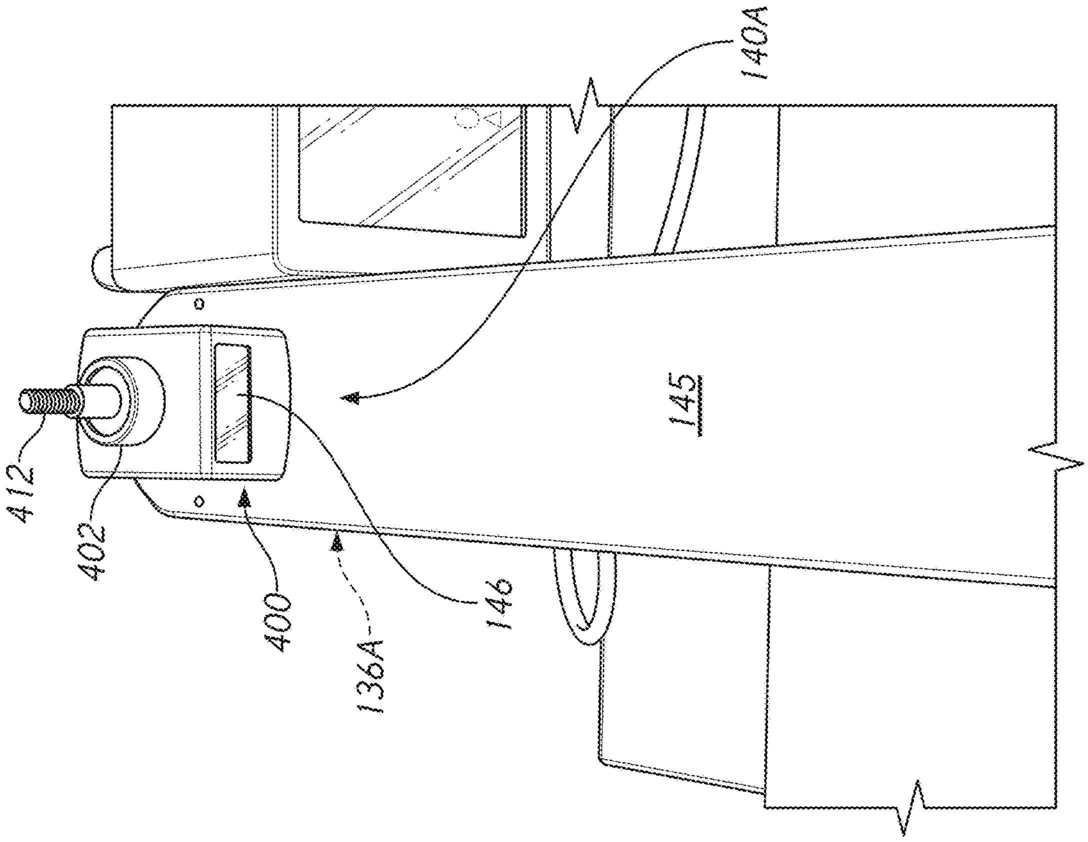
Figure 12:
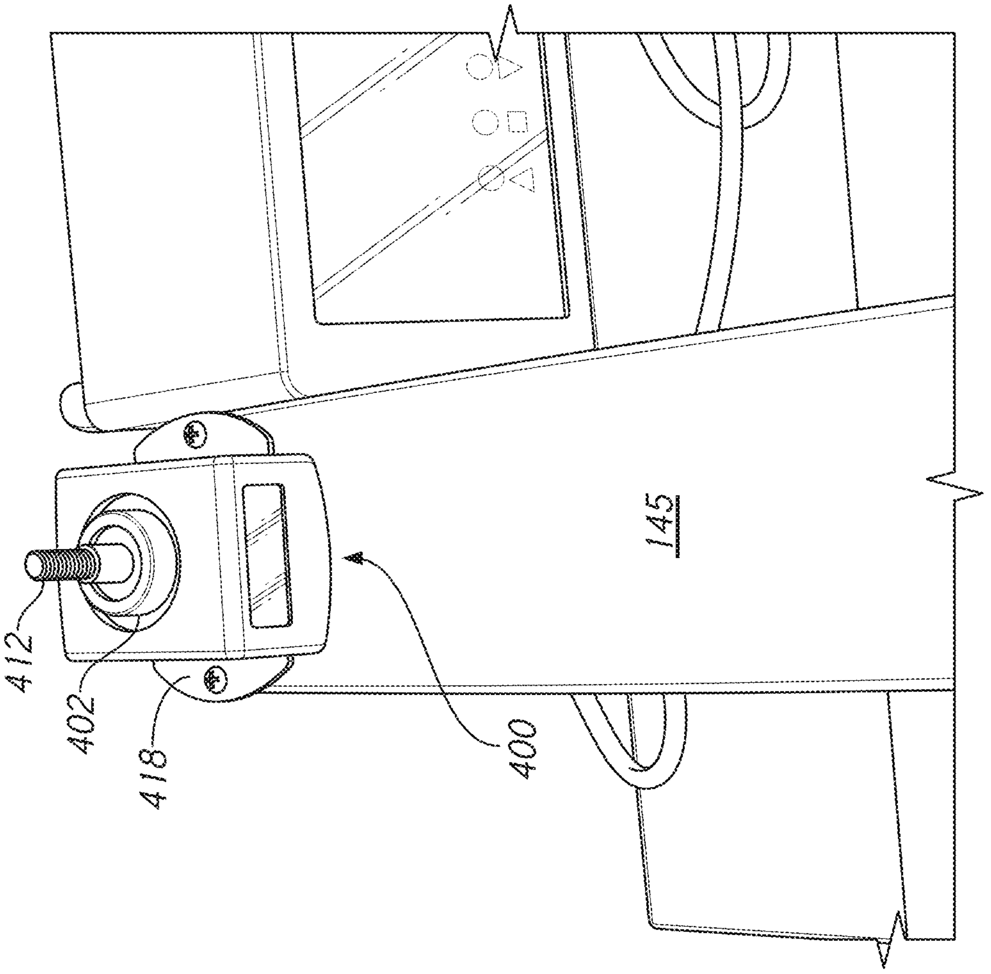
Figure 13:
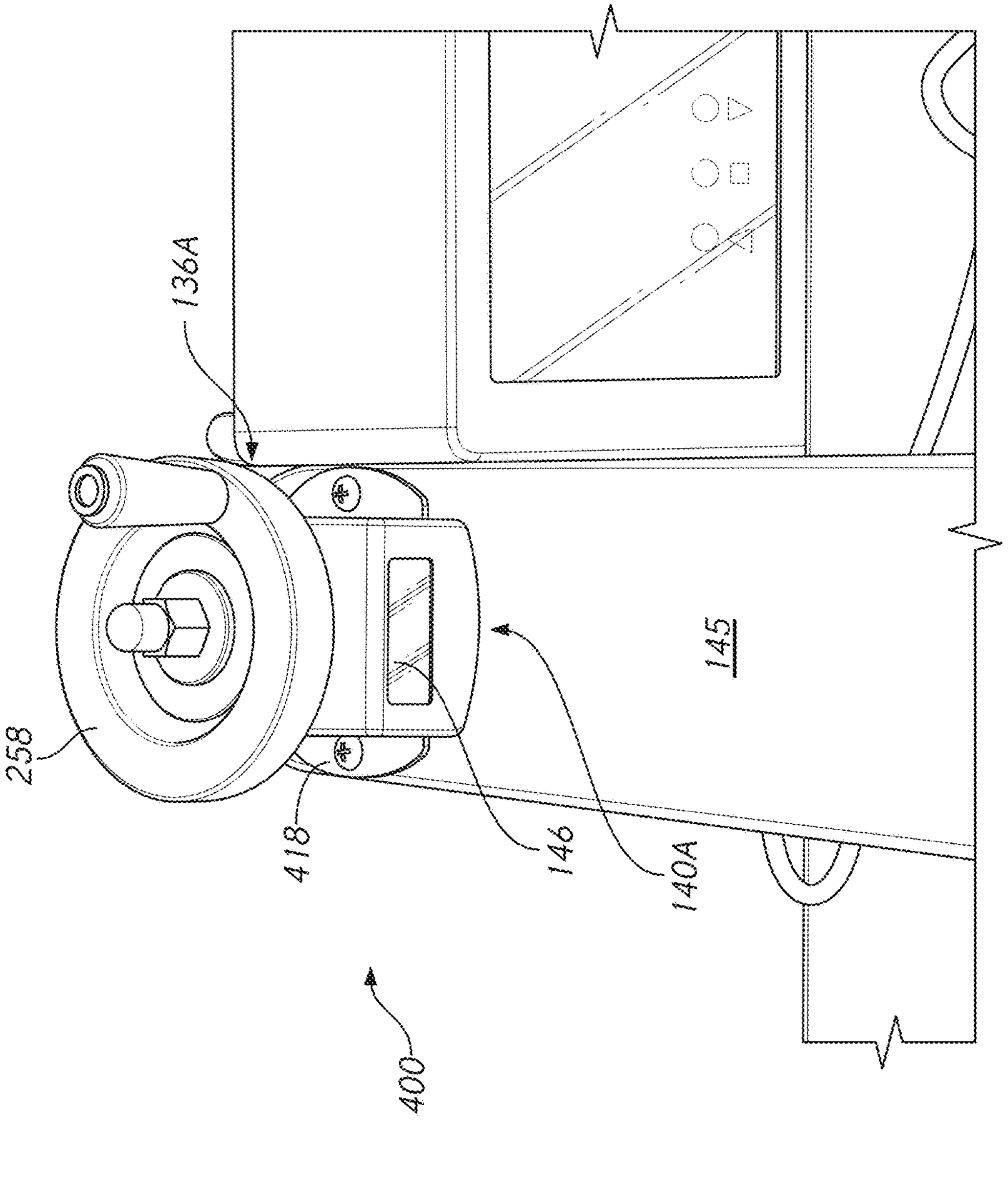

FIGS. 10-13 show a pressure control apparatus 400 and a method for applying the apparatus 400 to the heat press device 100A. FIG. 13 shows the pressure control apparatus 400 in one form fully assembled on the heat press device 100A. The pressure control apparatus 400 includes an indicator 140A that is similar to the indicator 140 except as described differently below. The indicator 140A has a user interface 146 which can be a numerical readout or any other user interface as discussed herein. FIG. 11 shows that the indicator 140A has an opening 402 for receiving a portion of a movement assembly 136A of the heat press device 100A. The movement assembly 136A is coupled with one or more platens of the heat press device 100A, similar to the movement assembly 136 discussed above. The movement assembly 136A can included the threaded member 254 disposed within the arm 145.

FIG. 10 shows that in one embodiment, the pressure control apparatus 400 includes a coupler 404. The coupler 404 can be configured to connect to and/or provide for an extension of the threaded member 254 of the heat press device 100A. In one embodiment a lower end of the coupler 404 includes a threaded recess configured to couple with a threaded end of the threaded member 254. The threaded end of the threaded member 254 extends out of the arm 145. The threaded recess of the coupler 404 provides a direct connection to the threaded end of the threaded member 254, which can be found in a heat press device that was not originally fitted with the indicator 140A. In one method, to couple the threaded recess of the coupler 404 with the threaded end of the threaded member 254, an actuator 258 that was previously connected to the threaded member 254 can be removed therefrom. The coupler 404 can have an elongate surface 408 configured to be positioned in the opening 402 of the indicator 140A. The surface 408 can be a smooth, cylindrical surface or can have at least one flat portion configured to mate with a corresponding flat surface in the opening 402. The coupler 404 can also have a threaded end 412 opposite the threaded recess. The threaded end 412 can be configured to mate with the actuator 258 in one embodiment.

FIG. 12 shows that the pressure control apparatus 400 can be secured to an arm 145 of the heat press device 100A by a bracket 418 configured to be applied to a surface of the indicator 140A and to the arm 145. The bracket 418 can have a lower surface configured to extend over a top surface of the indicator 140A. The bracket 418 also can extend over or along two sides of the indicator 140A. The bracket 418 can have two lateral flanges that can rest on top of a top surface of the arm 145 of the heat press device 100A. The lateral flanges of the bracket 418 can have screw holes (see FIG. 12) therein to enable screws to be advanced through the bracket and into the arm 145 to secure the pressure indicator 140A to the arm.

FIGS. 10-13 illustrate a system and a method for retrofitting a heat press device 100A with the pressure control apparatus 400 having an indicator 140A. An actuator 258 previously attached to the heat press device 100A can be removed as discussed above. The coupler 404 can be secured to a threaded end of the threaded member 254 to which the actuator 258 was previously connected. See FIG. 10. Thereafter the opening 402 of the indicator 140A can be advanced over the coupler 404 until the surface 408 is located in the opening 402. See FIG. 11. The coupler 404 can be rotationally secured to a rotatable member (e.g., a hollow cylinder) of the indicator 140A within a housing thereof. This can be accomplished with mating flat portions of the surface 408 and of the hollow cylinder within the indicator 140A, with adhesive, with a set screw or with other mechanical structures. The rotation of the coupler 404 therefore causes rotation of the rotational coupling element in the indicator 140A of the pressure control apparatus 400. Such rotation can be counted to provide a visual output of a pressure state, e.g., a numerical count of rotation or any of the other output techniques described above.

After the pressure control apparatus 400 is applied to the coupler 404 the bracket 418 can be advanced over the top of the pressure control apparatus such that an opening thereof is aligned with the opening 402 in the pressure control apparatus 400. See FIG. 12. The coupler 404 can extend through the bracket 418 at this opening. The lateral portions of the bracket 418 can then be secured to the top surface of the arm 145 as described above. The lateral portions of the bracket 418 can be secured above a column of the heat press device 100A through which a threaded member extends, e.g., in a swing-away configured heat press. Then the actuator 258 can be secured to the threaded end 412 of the coupler 408. See FIG. 13. The indicator 140A and the coupler 404 enable heat press devices to be adapted to provide improved pressure control thereof.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A heat press device for transferring a transfer material onto a workpiece, comprising:

a lower support surface being configured to support the workpiece and the transfer material;

an upper pressing surface;

a heating element disposed adjacent to the lower support surface and the upper pressing surface when the upper pressing surface is in a closed configuration for applying heat to the transfer material and the workpiece;

an actuator attached to the upper pressing surface to provide relative motion between the lower support surface and the upper platen pressing surface of the heating to enable the heat press device to be in an open configuration to provide access for the workpiece and the transfer material and in the closed configuration to apply a pressure to the workpiece and the transfer material;

a movement assembly having:

a threaded rod attached to the upper pressing surface;

a knob attached to the threaded rod for rotating the threaded rod in a clockwise or counterclockwise direction;

wherein rotation of the threaded rod traverses the upper pressing surface closer to or further away from the lower support surface to set a pressure state between the lower support surface and the upper pressing surface when the heat press device is in the closed configuration and the workpiece and transfer material are disposed between the upper pressing surface and the lower support surface; and an indicator configured to convey the rotational position of the threaded rod of the movement assembly which represents a predicted pressure state when the heat press device is traversed to the closed configuration while the workpiece and the transfer material are disposed between the upper pressing surface and the lower support surface.

2. The heat press device of claim 1, wherein the movement assembly includes a rack, the threaded rod, and the knob configured to provide relative rotation between the threaded rod and the rack to change the pressure state-between the lower support surface and the upper pressing surface.

3. The heat press device of claim 1, wherein the heat press device comprises a processor and the indicator comprises a user interface comprising a display configured to receive signals from the processor, wherein the processor is configured to process a signal indicative of the rotational position of the threaded rod.

4. The heat press device of claim 1, wherein the indicator provides a text output field indicative of the rotational position of the threaded rod.

5. The heat press device of claim 4, wherein the text output field is configured to display any one of a plurality of terms that correspond to an extent of the pressure on the workpiece and the transfer material when the heat press device is in the closed configuration.

6. The heat press device of claim 4, wherein the text output field is configured to display a type of workpiece or transfer material appropriate for processing when the heat press device is in the closed configuration.

7. The heat press device of claim 3, wherein the indicator is configured to generate a signal providing a digital readout to a digital readout field on the display.

8. The heat press device of claim 1, wherein the indicator provides an analog readout.

9. The heat press device of claim 8, wherein the analog readout comprises a needle gauge.

10. The heat press device of claim 1, wherein the indicator includes a color output field and is configured to display a color in the color output field indicating an acceptable pressure on the workpiece and/or the transfer material when the heat press device is in the closed configuration.

11. The heat press device of claim 1, wherein the indicator includes a speaker and is configured to provide an audio output indicating of a position of between the upper pressing surface and the lower support surface when the heat press device is in the closed configuration.

12. The heat press device of claim 11, wherein a separation results between the lower support surface and the upper pressing surface as the movement assembly is moved, wherein the audio output varies as the separation between the lower support surface and the upper pressing surface changes.

13. The heat press device of claim 12, wherein the audio output increases in frequency as the separation approaches a separation corresponding to acceptable pressure on the workpiece and/or the transfer material when the heat press device is in the closed configuration.

14. The heat press device of claim 1, wherein the indicator includes a graphical output field that displays a graphical icon that indicates that a separation between the lower support surface and the upper pressing surface of the heating corresponds to acceptable pressure on the workpiece and/or the transfer material when the heat press device is in the closed configuration.

15. The heat press device of claim 1, wherein the indicator comprises a scale and a pointer coupled with the threaded rod, the pointer being moveable with the threaded rod along or adjacent to the scale to indicate a separation between the lower support surface and the upper platen pressing surface, the separation corresponding to the pressure on the workpiece and/or the transfer material when the heat press device is in the closed configuration.

16. The heat press device of claim 1 wherein the threaded rod is attached to the lower support surface.

17. The heat press device of claim 1 wherein the actuator is attached to the movement assembly.

18. The heat press device of claim 1 wherein the actuator is a knob.

* * * * *